United States Patent [19]

Kronogård, deceased et al.

[11] Patent Number: 4,638,637
[45] Date of Patent: Jan. 27, 1987

[54] VEHICLE PROPULSION PLANT

[75] Inventors: Sven O. Kronogård, deceased, late of Lomma; Allen Lindén, administrator, Gothenburg; Clas O. Kronogard, Gråbo; Håkan Kronogård, Lund, all of Sweden

[73] Assignee: AB Volvo, Gothenburg, Sweden

[21] Appl. No.: 669,893

[22] Filed: Nov. 9, 1984

Related U.S. Application Data

[63] Continuation-in-part of Ser. No. 302,626, Sep. 15, 1981, abandoned.

[30] Foreign Application Priority Data

Sep. 29, 1980 [SE] Sweden ............................... 8006805

[51] Int. Cl.⁴ ............................................... F02B 73/00
[52] U.S. Cl. ................................... 60/718; 123/52 A; 123/DIG. 8
[58] Field of Search ................. 74/661, 665 B, 665 E; 60/698, 716, 718; 123/DIG. 8, 52 A, 198 F

[56] References Cited

U.S. PATENT DOCUMENTS

| | | | |
|---|---|---|---|
| 1,953,486 | 4/1934 | Kiep | 60/718 |
| 2,290,703 | 7/1942 | Ormsby | 60/708 |
| 3,332,404 | 7/1967 | Lovercheck | 123/52 A |
| 3,581,628 | 6/1971 | Williams | 123/52 A |
| 4,493,190 | 1/1985 | Yamakawa | 60/718 X |

FOREIGN PATENT DOCUMENTS

| | | | |
|---|---|---|---|
| 238791 | 12/1909 | Fed. Rep. of Germany. | |
| 2828298 | 1/1980 | Fed. Rep. of Germany. | |
| 215808 | 7/1941 | Switzerland | 60/716 |

Primary Examiner—Stephen F. Husar
Attorney, Agent, or Firm—Holman & Stern

[57] ABSTRACT

An internal combustion engine for vehicle propulsion has a number of cylinders arranged in two parallel planes and connected to two crank shafts within a common engine block. A selectively operable clutch is fitted at at least one of the crank shafts, and a gearing coordinates the output from the two crank shafts. A coupling is provided between the gearing and the output shaft of the engine plant.

2 Claims, 2 Drawing Figures

VEHICLE PROPULSION PLANT

This application is a continuation-in-part of U.S. patent application Ser. No. 302,626 filed Sept. 15, 1981, now abandoned.

BACKGROUND OF THE INVENTION

During recent years the development of vehicle propulsion plants has been directed towards fuel economy, while maintaining a high power output to meet increasingly intense traffic. Simultaneously, environmental considerations demand a reduction of exhaust gas emissions. The standards concerning fuel economy, purification of exhaust gases and safety, the latter including capacity for acceleration and versatility, may be expected to be more rigid in the future.

In order to meet the conditions above referred to, which to some extent act against each other, a complex technique will be required. A carburetor engine (an Otto-engine) is best suited among the piston engines to meet the primary requirements concerning high load performance, low weight and small volume, as well as low production costs, but there are difficulties in obtaining a low fuel consumption, especially during part-load, which is of decided importance when private cars are concerned. This is particularly noticable when traffic safety, carrying capacity, and versatility require a comparatively high maximum power output.

It is a well known fact, that the thermal efficiency will be increased when the compression ratio is increased. In contradistinction to the diesel engine an Otto-engine is supplied with a mixture of fuel and air, and this mixture has a tendency towards an uncontrolled and detrimental ignition (so called knocking), when the compression ratio is too high. This will impose close limits upon the maximum ratio of an Otto-engine. On the other hand the power output is governed by "throttle-control" of the air inlet, which results in a lower volumetric efficiency and consequently a reduced compression ratio, and also a lower operating efficiency.

Instead of reducing the power output from all cylinders, the objective should be to reduce the number of active cylinders, and to let the still active cylinders work under a high load.

The number of occasionally operating cylinders may be reduced by locally shutting off the fuel supply to some cylinders, or by manipulating the valve gear operating mechanism. That will, however, require rather complicated control gear, and frictional losses due to the pistons reciprocating in idle position cannot be avoided.

The objective of the present invention is to provide a subdivision of the cylinders of the plant into parts, which may be switched in and out as required. It is for instance possible to form one part so it takes about ⅓ of the maximum output, and a second part suited to take about ⅔ of the maximum output. It will then be possible to operate the engine within three different output ranges, with a high efficiency in all of them, depending upon the fact that it is possible to rely upon a small throttle governing within each range, and thus a high compression ratio in the occasionally serviceable cylinders.

The improved fuel economy during part load will in the first hand result in a reduction of the exhaust gas volume, and as the combustion within the cylinders will occur about at the compression ratio for which the engine is designed, the content of dangerous emission products will be maintained at low, controlled values.

SUMMARY OF THE INVENTION

A vehicle propulsion plant according to the invention comprises an internal combustion engine having a number of cylinders operating an output shaft is characterized in a common engine block mounting all cylinders in two parallel planes forming a first and a second group. The pistons in the cylinders are operatively connected to crank shafts, and an a selectively operable clutch, having an input part and an output part is fitted at the output end of at least one of the crank shafts. A gearing means coordinates the outputs from the groups of cylinders, and a coupling means connects the gearing means with the output shaft.

The first group of cylinders may be permanently connected to said coupling means, while the second group of cylinders is selectively connectable to coupling means by way of the clutch means. The second group of cylinders may be equipped with means for supercharging the combustion air supplied thereto.

Alternatively both crank shafts may be connected to an a selectively operable clutch means having an input part and an output part, the gearing means interconnecting the output parts of the clutch means.

DETAILED DESCRIPTION

Figure 1:
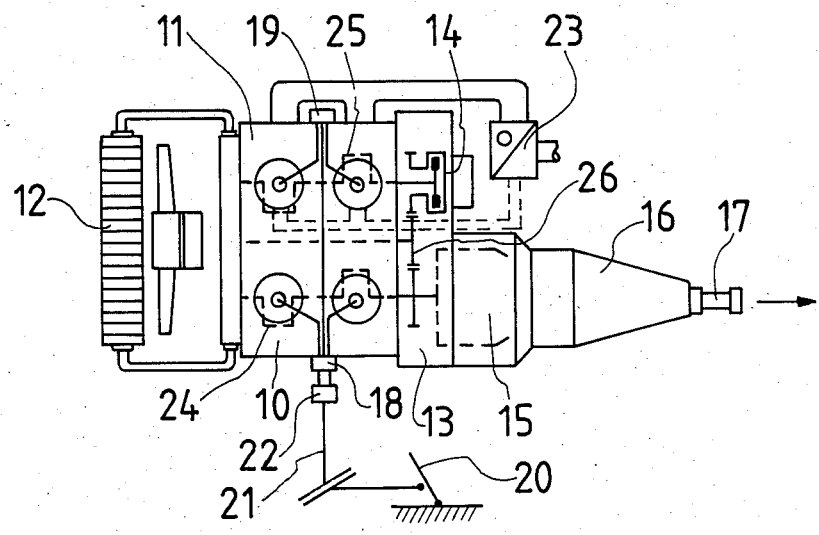
FIG. 1 shows a first embodiment of the invention including two plus two cylinders.

The vehicle propulsion plant shown in FIG. 1 includes an internal combustion engine having four cylinders arranged in two groups 10 and 11 of two cylinders each. The cylinders are integrated in a common engine block, produced for instance by die-casting. The cooling and the lubricating systems are common to both groups of cylinders. A cooler with its fan is denoted by 12.

Within a transmission housing 13 there is a clutch 14 for selectively connecting the group 11 of cylinders to the output from the group 10 of cylinders. A torque converter 15 is directly connected to the group of cylinders 10, and is followed by a conventional gear box 16. The output shaft is denoted by 17.

By locating the two groups of cylinders in a common engine block, the machining and fitting together will be considerably reduced. The transmission housing may be integral with the engine block, which further reduces machining costs.

The fuel supply system includes a fuel injection apparatus 18, 19 for each group of cylinders. The gas pedal of the vehicle is denoted by 20, and it operates, by way of a link mechanism 21, a device 22, for instance including a rheostat, which determines the amount of fuel supplied, as well as the point at which the group 11 of cylinders is switched in and out, respectively.

The cylinder group 11 is equipped with a supercharger 23 and is thus the more powerful unit of the two. The cylinders have the same dimensions, but by using ceramics in the cylinder liners and the pistons in group 11, this will be able to take care of a high thermal load. Cylinder group 10 can be operated alone, when a low power output is required, and will not be subjected to undue wear. Group 11 is mostly used during short spells, and its top output is seldom required. With a fifty percent supercharge, each of the two groups would normally take care of forty percent of the top load, the remaining twenty percent being obtained by occasional supercharging of the cylinders of group 11. With a hundred percent supercharge of that group you will obtain an output increase in three steps of equal magnitude.

The output ends of the crank shafts 24, 25 for the two groups are interconnected by a gearing 26, in the case of group 11, via the clutch 14.

Figure 2:
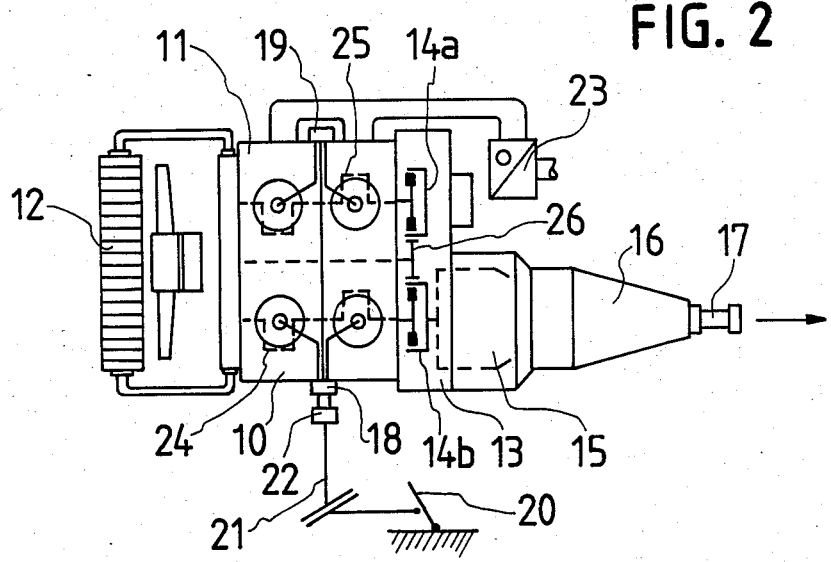
FIG. 2 shows a modification thereof.

The embodiment according to FIG. 2 is mainly the same as that of FIG. 1. Here, however, the crank shafts 24, 25 are each connected to a clutch 14a and 14b, respectively. The gearing 26a interconnects the output parts of the clutches and it will thus be possible to operate either group 10, 11 of cylinders alone, or both together.

The specification and the drawings refer to an engine having two plus two cylinders, but that should not be regarded as limiting the invention, as the number of cylinders can vary, and further modifications may be made within the scope of the appended claims.

What we claim is:

1. A vehicle propulsion unit comprising an internal combustion engine having a plurality of cylinders for driving an output shaft, the cylinders being arranged in first and second groups in a common engine block with first and second crank shafts for the respective groups, a permanent drive connection between the first crank shaft and the output shaft, and a second drive connection including a selectively operable clutch for selectively connecting the second crank shaft with said permanent drive connection whereby the output shaft can be driven selectively by said first group of cylinders alone and by both said first and second groups of cylinders through the selective disconnection and connection respectively of said clutch, the propulsion unit including supercharging means associated with the second group of cylinders.

2. A vehicle propulsion unit comprising an internal combustion engine having a plurality of cylinders for driving an output shaft, the cylinders being arranged in first and second groups in a common engine block with first and second crank shafts for the respective groups, a first selectively operable clutch having a drive member connected to the first crank shaft, a second selectively operable clutch having a drive member connected to the second crank shaft, the clutches having respective driven members connected by gear means to the output shaft, and control means for selectively connecting and disconnecting the drive and driven members of the respective clutches for selectively driving the output shaft by said first group of cylinders only, by said second group of cylinders only, and by both said first and second groups of cylinders, the propulsion unit including supercharging means associated with the second group of cylinders.

* * * * *